United States Patent [19]

Duplantis

[11] Patent Number: 4,792,306

[45] Date of Patent: Dec. 20, 1988

[54] INSTRUCTIONAL DEVICE FOR TEACHING DENTAL X-RAY TECHNIQUES

[76] Inventor: Shannon Duplantis, 3701 James Dr., Metairie, La. 70003

[21] Appl. No.: 101,191

[22] Filed: Sep. 25, 1987

[51] Int. Cl.4 .............................................. G09B 23/28
[52] U.S. Cl. .................................................... 434/264
[58] Field of Search ................. 434/263, 264; 433/229

[56] References Cited

U.S. PATENT DOCUMENTS

| | | | |
|---|---|---|---|
| 3,520,060 | 7/1970 | Crabtree et al. | 434/264 |
| 4,073,071 | 2/1978 | Angelotti | 434/264 |
| 4,200,996 | 5/1980 | Richards | 434/264 |

Primary Examiner—James C. Yeung
Attorney, Agent, or Firm—Pravel, Gambrell, Hewitt, Kimball & Krieger

[57] ABSTRACT

An instructional device for teaching dental x-ray techniques comprises a simulated x-ray machine having simulated x-ray controls and a simulated x-ray cone. It also comprises a simulated mouth, having a simulated mandible and a simulated maxilla, each of which have simulated teeth thereon. The simulated maxilla may be moved relative to the simulated mandible. The simulated x-ray cone is movable relative to the simulated mouth. The device can be used for a substitute for a live patient and an x-ray machine when learning dental x-ray techniques.

20 Claims, 3 Drawing Sheets

INSTRUCTIONAL DEVICE FOR TEACHING DENTAL X-RAY TECHNIQUES

BACKGROUND OF THE INVENTION

1. Field of the Invention

The present invention relates generally to instructional devices, and more particularly, to instructional devices for teaching dental x-ray techniques.

2. General Background

When x-raying teeth, it is important to align the face of the x-ray cone parallel with the face of the x-ray film; otherwise, the x-rays will be inaccurate. Also, it is important to properly set the time and intensity of the x-radiation, so that the film will be neither under exposed nor over exposed.

It is common practice to use live patients when training dental x-ray technicians to use dental x-ray machines. Unfortunately, prolonged exposure to x-radiation is harmful, and in training a dental x-ray technician using the standard methods prevalent today, multiple x-rays are taken, and retaken, and taken again, until the technician learns the proper techniques for x-raying. Thus, in addition to the patient getting exposed to unnecessary x-radiation, he also usually gets tired of sitting still as x-ray after x-ray is taken.

There have been proposals to provide a substitute for a live patient when training dental x-ray technicians. One such proposal is disclosed in U.S. Pat. No. 3,520,060, in which a model of a patient's head is made by covering a human skull with a tissue-equivalent plastic. The head is adapted to be mounted on a dental chair. The mouth of the head opens and closes, allowing x-ray film to be placed in the mouth so technicians can practice taking x-rays of the teeth. Aside from being relatively expensive (human skulls are not cheap) the head must be used in conjunction with a chair and an x-ray machine.

U.S. Pat. No. 4,200,996 discloses another proposal, to provide a substitute for a live patient when training x-ray technicians, which comprises a plastic replica of a human skull, a simulated x-ray cone, and a plurality of slides of x-rays of the teeth of the human skull from which the plastic replica is made. The position of the x-ray cone determines what slide will be visible to the user of the apparatus, the slide which is visible corresponding to an x-ray which would be taken with an actual x-ray cone in that position. This apparatus is relatively expensive and cumbersome. Also it, like the device described above, shows only a single skull, and thus does not help teach technicians to x-ray patients of varying ages in varying stages of development.

SUMMARY OF THE PRESENT INVENTION

The present invention provides relatively simple, inexpensive apparatus for training dental x-ray technicians without the use of live patients.

The present invention comprises a simulated mouth, having a simulated maxilla (upper jaw) and a simulated mandible (lower jaw) and representations of human teeth on the simulated maxilla and simulated mandible, a simulated x-ray cone, and means for allowing movement of the simulated x-ray cone relative to the simulated mouth. The simulated maxilla is movable relative to the simulated mandible.

The device may further comprise a simulated x-ray machine body, with simulated controls.

The device of the present invention allows students learning dental x-ray techniques to practice properly placing x-ray film in a patient's mouth, properly orienting an x-ray cone relative to the x-ray film, and properly setting the controls of an x-ray machine. The device of the present invention allows all of this to be done without a live patient, without an expensive x-ray machine, and without harmful x-radiation.

It is an object of the present invention to provide an instructional device for teaching dental x-ray techniques.

It is a further object of the present invention to provide such a device which allows a student to practice properly placing dental x-ray film in a mouth.

It is also an object of the present invention to provide such a device which facilitates viewing of the dental x-ray film when the mouth is closed.

A further object of the present invention is to provide such a device which allows a student to practice properly aligning and positioning an x-ray cone relative to dental x-ray film.

Another object of the present invention is to provide a device which allows a student to practice setting controls of an x-ray machine.

A further object of the present invention is to provide such a device which allows a student to simulate taking dental x-rays of the upper and lower occlusals.

BRIEF DESCRIPTION OF THE DRAWINGS

For a further understanding of the nature, objects, and advantages of the present invention, reference should be had to the following detailed description, taken in conjunction with the accompanying drawings, in which like reference numerals denote like elements, and wherein.

DETAILED DESCRIPTION OF THE PREFERRED EMBODIMENT

Figures 1, 2:
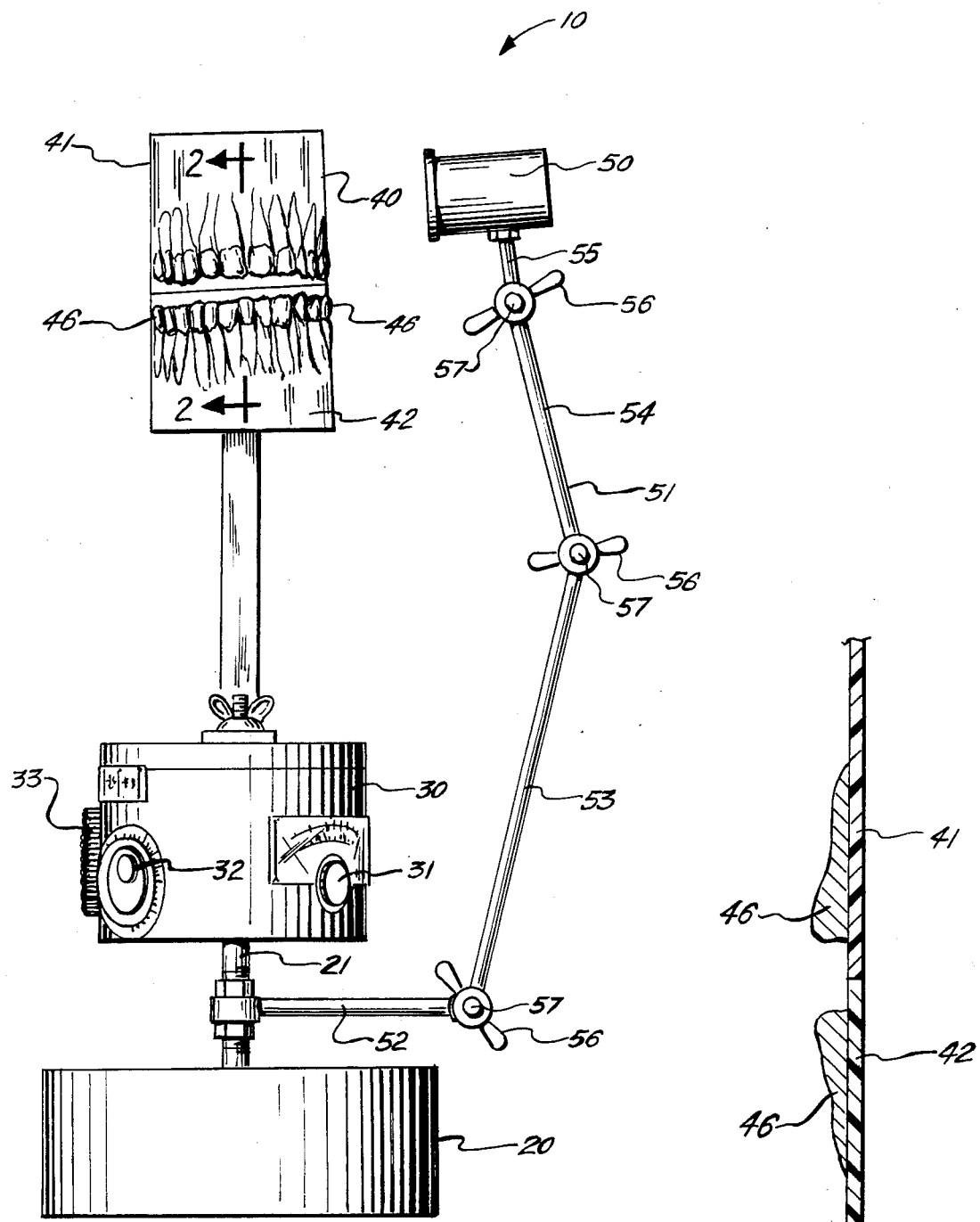
FIG. 1 is a front view of the device of the preferred embodiment of the present invention.
FIG. 2 is a sectional, partially cut-away view taken along the lines 2—2 in FIG. 1.
Figures 3, 5:
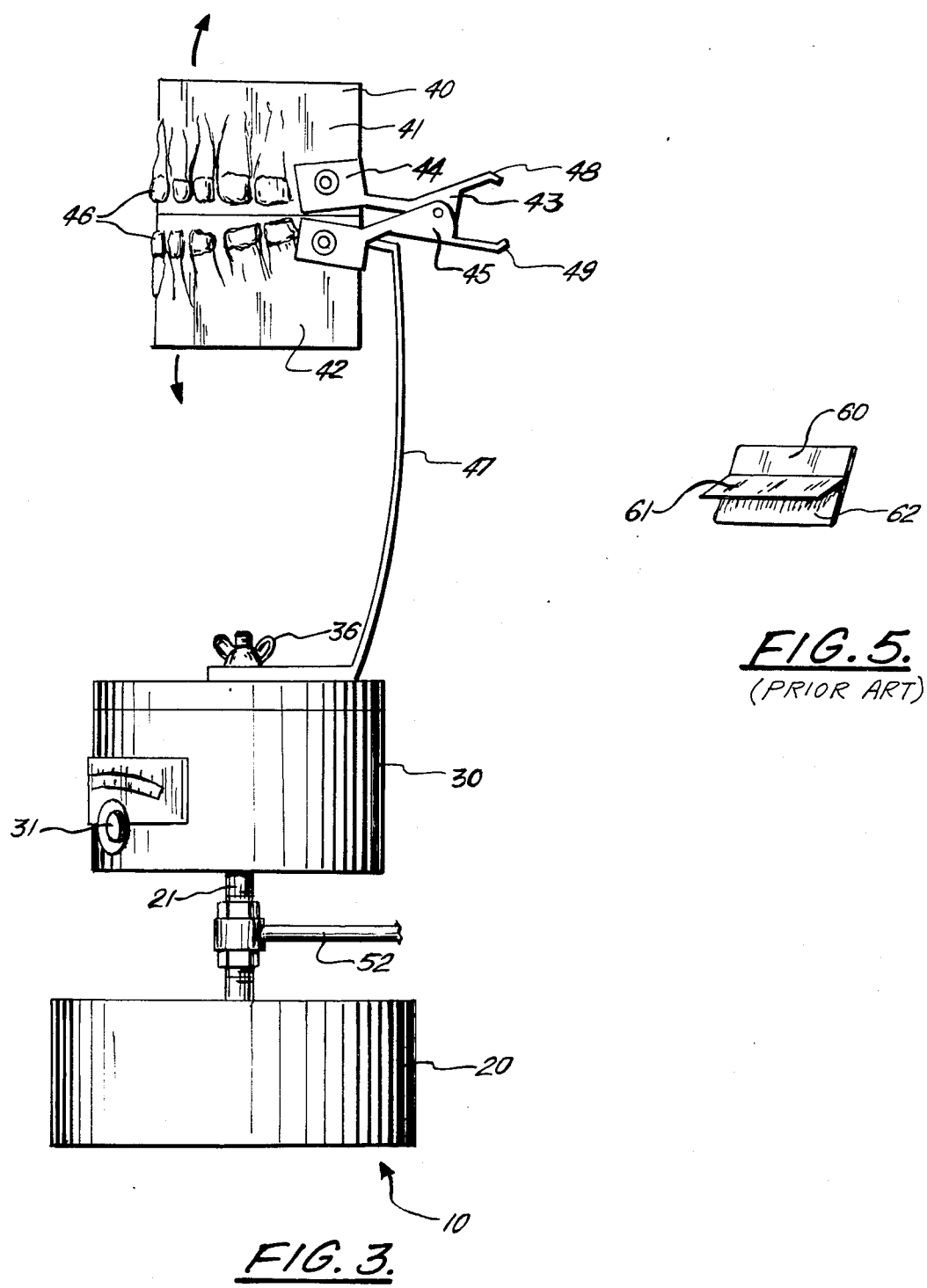
FIG. 3 is a side view of the preferred embodiment of the present invention, with the simulated x-ray cone and part of the multi-jointed arm not shown.
FIG. 5 is a perspective view of x-ray film used in taking dental x-rays.

The preferred embodiment of the apparatus of the present invention, instructional device 10, is shown in FIGS. 1-4.

Instructional device 10 comprises a base 20, a body 30 connected to base 20 with shaft 21, a simulated mouth 40, and a simulated x-ray cone 50.

Body 30 and simulated x-ray cone 50 together represent an actual x-ray machine. Simulated mouth 40 represents a patient's mouth which is to be x-rayed.

Body 30 has simulated controls 31 and 32 thereon. Simulated control 31 is a simulated intensity control, and control 32 is a simulated timer. Simulated controls 31 and 32 correspond to actual controls on an actual x-ray machine. Coil 33 represents the coiled wire connecting a hand-held switch to an x-ray machine.

Simulated x-ray cone 50 is pivotally mounted on multi-jointed arm 51, which itself is pivotally mounted on shaft 21. Multi-jointed arm 50 comprises a horizontal segment 52, which is pivotally connected to a substantially vertical segment 53, which itself is pivotally connected to a second substantially vertical segment 54. A third substantially vertical segment 55 is pivotally connected to x-ray cone 50 and substantially vertical segment 54. Wing nuts 56 control the tightness of the connections between each segment 52-55 and a segment adjacent it.

Simulated mouth 40 comprises a simulated maxilla 41 and a simulated mandible 42. Simulated maxilla 41 is attached to upper arm 44 of clamp 43. Simulated mandible 42 is attached to lower arm 45 of clamp 43 (see FIG. 3). Lower arm 45 is fixedly attached to vertical support 47, which itself is removably attached to body 30 with wing nut 36. Simulated teeth 46, preferably made of plastic, are mounted on simulated maxilla 41 and simulated mandible 42. Simulated maxilla 41 and simulated mandible 42 are preferably transparent.

In operation, a student opens simulated mouth 40 by squeezing together handles 48 and 49. An x-ray film 60 (see FIG. 5) is then placed in the simulated mouth 40, with tab 61 of x-ray film 60 projecting out of simulated mouth 40. Simulated mouth 40 is then allowed to close, clamping tab 61 between simulated maxilla 41 and simulated mandible 42. Simulated x-ray cone 50 is then brought into proximity with the part of mouth 40 where x-ray film 60 is positioned. Segment 52 of multi-jointed arm 51 can rotate 360° around shaft 21, multi-jointed arm pivots at points 57 (see FIG. 1), and simulated x-ray cone 50 can rotate 360° on substantially vertical segment 55. Thus, simulated x-ray cone 50 can be oriented and positioned in countless ways near simulated mouth 40. Simulated x-ray cone 50 is aligned such that the face of cone 50 is parallel to the sensitive area 62 of x-ray film 60. The controls of the simulated x-ray machine are then set using simulated controls 31 and 32. An instructor then views the students' work to check parallel alignment of the face of cone 50 and sensitive area 62 of film 60, as well as the setting of simulated controls 31 and 32. Alternatively, the student could consult a manual which would be provided with apparatus 10 to see if, for the particular type of x-ray she was simulating taking, the x-ray film 60 and cone 50 were properly positioned, and the setting of controls 31 and 32 were proper.

Figure 4:
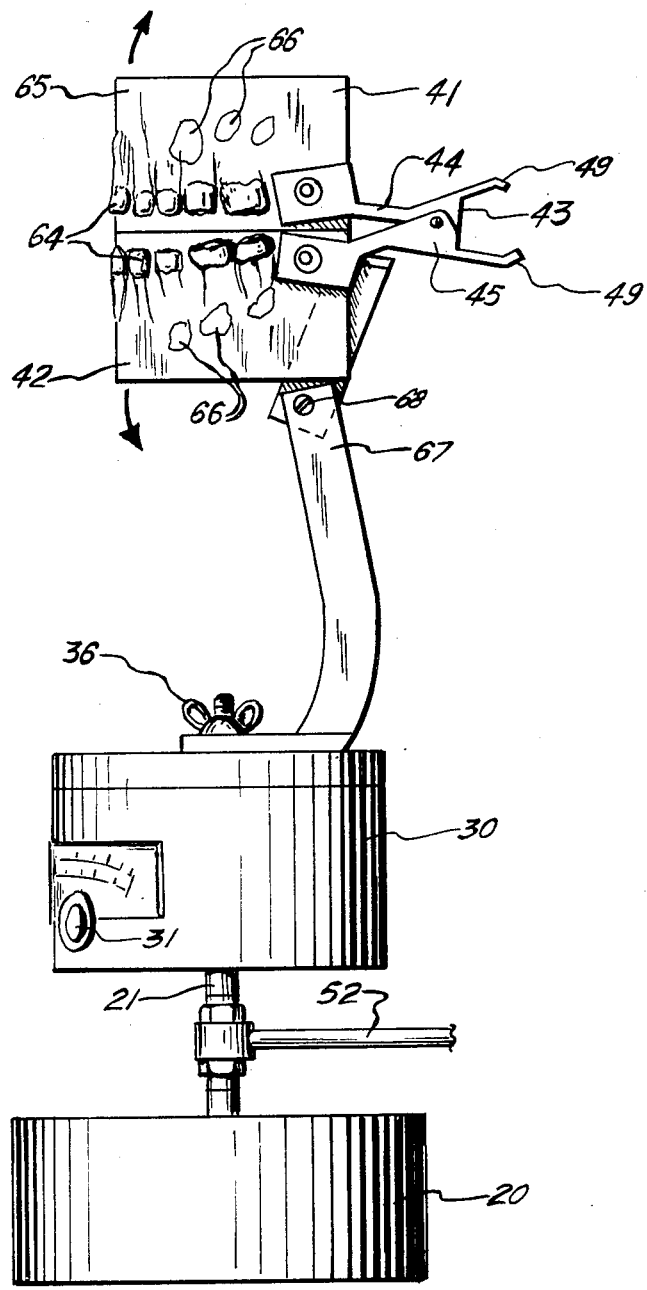
FIG. 4 is a view similar to FIG. 3, showing a different simulated mouth and vertical support.

FIG. 4 shows instructional device 10 with simulated mouth 40 and vertical support 47 replaced by simulated mouth 65 and vertical support 67. Simulated mouth 65 represents a child's mouth, and for this reason vertical support 67 is made pivotal at 68. With children, much more frequently than adults, it is often necessary to take lower occlusal x-rays, which require that the patient tilt his head backward, and upper occlusal x-rays, which require the patient to tilt his head forward. Pivot points 68 allows tilting of simulated mouth 65 both forward and backward to allow a student to simulate taking occlusal x-rays. Mouth 65 also shows both "baby" teeth 64 and permanent teeth 66. This allows the student to practice x-raying teeth which are not even yet visible to the naked eye.

Simulated mouth 40 is preferably approximately the same size as an actual mouth and simulated x-ray cone 50 is preferably approximately the same size as a real x-ray cone. Body 30, on the other hand, is much smaller than the body of an actual x-ray machine. Since only the simulated controls 31 and 32 of the simulated x-ray machine are manipulated, body 30 can advantageously be made smaller without losing authenticity in the part (simulated controls 31 and 32) being manipulated. Further, only a simulated mouth is present to represent a patient, since that is the only part of a patient which is manipulated when taking dental x-rays. Thus, with the device of the present invention, all essential, manipulatable features of a patient and a dental x-ray machine are represented by simulated features which are approximately actual size, while those features which are not manipulatable are omitted or are miniaturized for convenient construction and transportation of the device 10.

Although simulated teeth 46, 64 and 66 are shown in the drawings as reproductions of human teeth projecting out of maxilla 41 and mandible 42, the present invention could also be practiced with two dimensional representations of teeth, such as paintings of teeth on simulated maxilla 41 and simulated mandible 42. One could use paint with a lead base so, if desired, x-rays could be taken of the painted teeth. Also, two dimensional representations of human teeth could be printed onto decals, and these decals could be fixedly attached to simulated maxilla 41 and simulated mandible 42.

It should be noted that simulated maxilla 41 and simulated mandible 42 could comprise reproductions of actual human maxillas and mandibles.

In view of the numerous modifications which could be made to the preferred embodiments disclosed herein without departing from the scope or spirit of the present invention, the details herein are to be interpreted as illustrative and not in a limiting sense.

What is claimed as invention is:

1. An instructional device for teaching dental x-ray techniques, the device comprising:
   a simulated mouth comprising:
   a simulated mandible;
   a simulated maxilla;
   simulated teeth on the simulated maxilla and simulated mandible; and
   means for moving the simulated maxilla relative to the simulated mandible, wherein x-ray film placed in the simulated mouth may be viewed by a person's naked eye when the simulated mouth is closed;
   a simulated x-ray cone; and
   means for allowing movement of the x-ray cone relative to the simulated mouth.

2. The device of claim 1 wherein the simulated maxilla and the simulated mandible are transparent.

3. The device of claim 1 wherein the simulated mouth is connected to a body and the simulated cone is pivotally connected to the body.

4. The device of claim 3 further comprising simulated x-ray controls on the body.

5. The device of claim 3 wherein the simulated mouth is pivotally connected to the body.

6. The device of claim 1 wherein the simulated teeth comprise replicas of actual human teeth.

7. The device of claim 3 wherein the simulated mouth is removably connected to the body.

8. An instructional device for teaching x-ray techniques, the device comprising:
   a simulated mouth comprising:
   a transparent simulated maxilla;
   a transparent simulated mandible;
   simulated human teeth on the simulated maxilla and simulated mandible; and
   means for moving the simulated maxilla relative to the simulated mandible;
   a simulated x-ray cone; and means for allowing movement of the simulated x-ray cone relative to the simulated mouth.

9. The device of claim 8, further comprising a body and means for pivoting the simulated mouth relative to the body.

10. The device of claim 8, further comprising:
means for connecting the simulated mouth to a body; and
means for pivotally connecting the simulated x-ray cone to the body.

11. The device of claim 10, further comprising simulated x-ray controls on the body.

12. The device of claim 8, wherein the simulated teeth comprise plastic replicas of actual human teeth.

13. The device of claim 10, wherein the simulated mouth is removably connected to the body.

14. An instructional device for teaching dental x-ray techniques, the device comprising:
a simulated x-ray machine including a body and a simulated x-ray cone, the body having simulated x-ray controls thereon, the simulated x-ray cone being pivotally connected to the body;
a simulated mouth connected to the body of the simulated x-ray machine, the simulated mouth comprising:
a simulated maxilla;
a simulated mandible;
simulated human teeth on the simulated maxilla and the simulated mandible; and
means for moving the simulated maxilla relative to the simulated mandible; and
means for allowing movement of the simulated x-ray cone relative to the simulated mouth.

15. The device of claim 14 wherein the simulated mouth is pivotally connected to the body.

16. The device of claim 14, wherein the simulated teeth comprise three dimensional reproductions of human teeth.

17. The device of claim 14, wherein the simulated mouth is removably connected to the body.

18. The device of claim 14, wherein the simulated maxilla and simulated mandible are transparent.

19. The device of claim 14, wherein the simulated x-ray controls comprise a simulated intensity control.

20. The device of claim 14, wherein the simulated x-ray controls comprise a simulated timer.

* * * * *